United States Patent [19]

Mikami

[11] Patent Number: 5,617,174
[45] Date of Patent: Apr. 1, 1997

[54] ACTIVE RANGE FINDING DEVICE

[75] Inventor: Kazuo Mikami, Hachioji, Japan

[73] Assignee: Olympus Optical Co., Ltd., Tokyo, Japan

[21] Appl. No.: 443,444

[22] Filed: May 18, 1995

[30]     Foreign Application Priority Data

May 27, 1994 [JP] Japan .................................. 6-115321

[51] Int. Cl.$^6$ .................................................. G03B 13/36
[52] U.S. Cl. ............................... 396/95; 396/106; 396/79
[58] Field of Search .................................. 354/400, 402, 354/403, 404, 408

[56]                References Cited

U.S. PATENT DOCUMENTS

| 5,056,914 | 10/1991 | Kollodge | ................................. | 354/403 |
| 5,140,359 | 8/1992 | Higashihara et al. | .................... | 354/402 |
| 5,303,019 | 4/1994 | Irie | .......................................... | 354/402 |

FOREIGN PATENT DOCUMENTS 63-159817  7/1988  Japan .
2-149810   6/1990  Japan .

*Primary Examiner*—Safet Metjahic
*Assistant Examiner*—D. P. Malley
*Attorney, Agent, or Firm*—Frishauf, Holtz, Goodman, Langer & Chick

[57]          ABSTRACT

An active range-finding device includes a light-projecting section for successively projecting range-finding light beams toward an object in a plurality of directions, a plurality of light-receiving sections for receiving light beams reflected from the object, a distance data calculating section for calculating a distance to the object on the basis of a plurality of outputs from the light-receiving sections, and a speed calculating section for calculating the movement speed of the object in two directions perpendicular to each other which include at least the direction of the optical axis of a photographing lens. The position of the photographing lens at the time of film exposure is corrected on the basis of the movement speed of the object output from the calculating section.

13 Claims, 7 Drawing Sheets

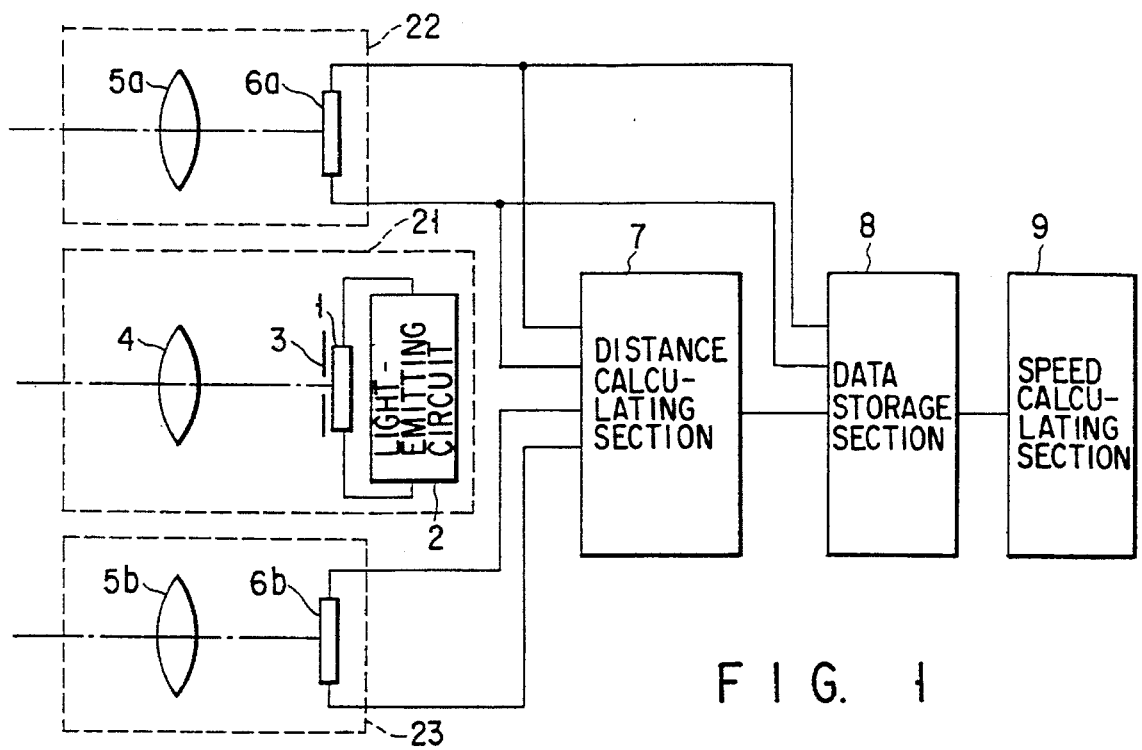
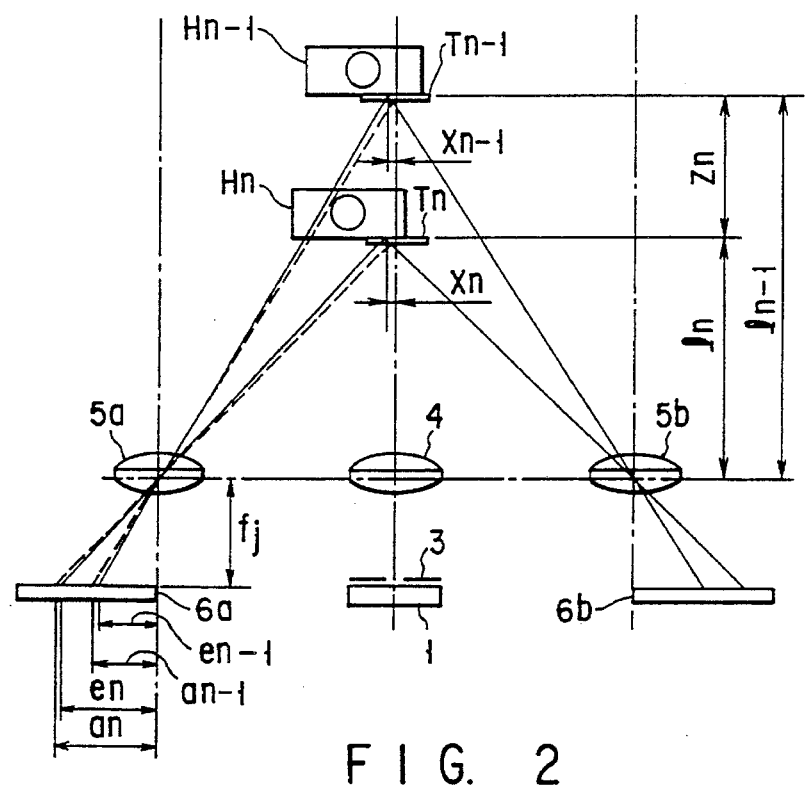

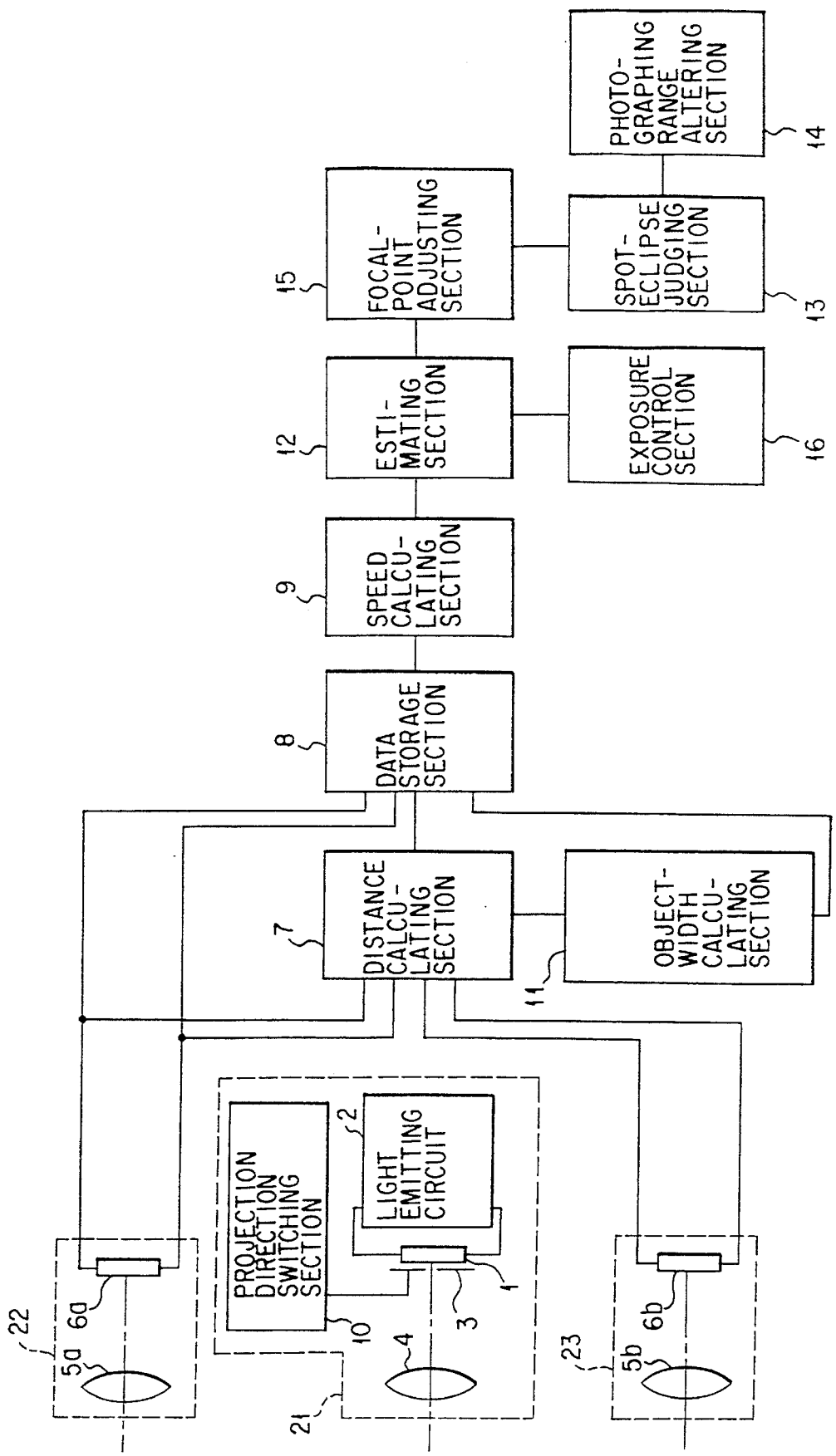
F I G. 6

ACTIVE RANGE FINDING DEVICE

BACKGROUND OF THE INVENTION

1. Field of the Invention

This invention relates to a range-finding device for use in an optical apparatus such as a camera, and more particularly to an active range-finding device capable of measuring the distance between the device and a moving object, estimating the position of the object assumed at the time of photographing the same, thereby achieving accurate distance measurement thereof. Range-finding is alternately referred to herein as "ranging".

2. Description of the Related Art

So-called active ranging devices have been used for various purposes. These devices projects distance-measuring light onto an object, receive light reflected therefrom and calculates the distance between the device and the object on the basis of a signal indicative of received light. The active type is characterized in that the measurement accuracy is proportional to the amount of received light.

In the active type ranging devices, there is a case where an object is only partially radiated with light (i.e. so-called spot eclipse has occurred). In such a case, the centroid of the spot of projected light may be deviated from that of the spot of light reflected from the object, resulting in a ranging error. As a technique for preventing a ranging error due to spot eclipse, it is known to cancel an error between the centroid of the spot of projected light and that of the spot of reflected light, on the basis of signals output from a plurality of light receiving means.

Furthermore, various techniques have been proposed for real-time measuring of a distance to a moving object to perform automatic focus adjustment. For example, Jpn. Pat. Appln. KOKAI Publication No. 63-159817 discloses a technique for measuring a distance to a moving object at regular intervals, and estimating the distance to the object at which distance the object will be photographed.

In addition, Jpn. Pat. Appln. KOKAI Publication No. 2-149810, etc. discloses a technique for measuring a distance to an object which can move also in a lateral direction with respect to a ranging device, and calculating the speed of the movement. In this technique, a plurality of light-receiving elements are provided, distance data and element data are output in time sequence, and the movement speed of an object is calculated on the basis of the distance data and the element data. The accuracy of detection is enhanced by employing a large number of light-receiving elements and ranging points. Moreover, there is known a technique for repeatedly measuring a distance to a predetermined portion of an object and calculating the average value of the measurement results in order to enhance the accuracy of ranging.

Although in the case of the above-described technique using a plurality of light-receiving elements a ranging error due to spot eclipse can be prevented, a reduction in the amount of receiving light due to the spot eclipse cannot be prevented, resulting in a reduction in ranging accuracy.

Further, although the technique disclosed in Jpn. Pat. Appln. KOKAI Publication No. 63-159817 can estimate, from distance data, the distance to the object at which distance the object will be photographed, the technique can only detect the movement of the object in the direction of the optical axis.

Moreover, although the technique disclosed in Jpn. Pat. Appln. KOKAI Publication No. 2-149810 can detect the movement of an object in the direction of the optical axis of a photographing lens and in a direction perpendicular thereto, it requires a plurality of light-receiving elements and hence a high manufacturing cost. In addition, to detect a distance to a moving object and detect its position this known technique requires that measurement at a plurality of ranging points be repeated, with the result that a great amount of time is required for ranging.

SUMMARY OF THE INVENTION

The present invention has been developed under the above-described circumstances, and aims to provide an active ranging device capable of performing accurate ranging even when spot eclipse has occurred, and detecting, at high speed, the movement of an object in at least two directions including the direction of the optical axis.

To attain the aim, there is provided an active ranging device comprising: light-projecting means for successively projecting ranging light beams toward an object in a plurality of directions; a plurality of light-receiving means for receiving light beams reflected from the object; and calculating means for calculating a distance to the object and a condition of state of the range-finding light beams reflected by the object, on the basis of a plurality of outputs from the light-receiving means. Further, the calculating means calculates, on the basis of changes in the outputs of the light-receiving means with the passing of time, the movement speed of the object in two directions which include at least the direction of the optical axis of a photographing lens. The active ranging device further comprises correction means for correcting the state of the photographing lens at the time of film exposure on the basis of the movement speed of the object output from the calculating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram, showing an active ranging device according to a first embodiment of the invention;

FIG. 2 is a view, useful in explaining the principle of calculation of the movement speed of an object in the direction of the optical axis and in a direction perpendicular thereto;

FIG. 6 is a block diagram, showing an active ranging device according to a second embodiment of the invention;

DETAILED DESCRIPTION OF THE PREFERRED EMBODIMENTS

Figure 3:
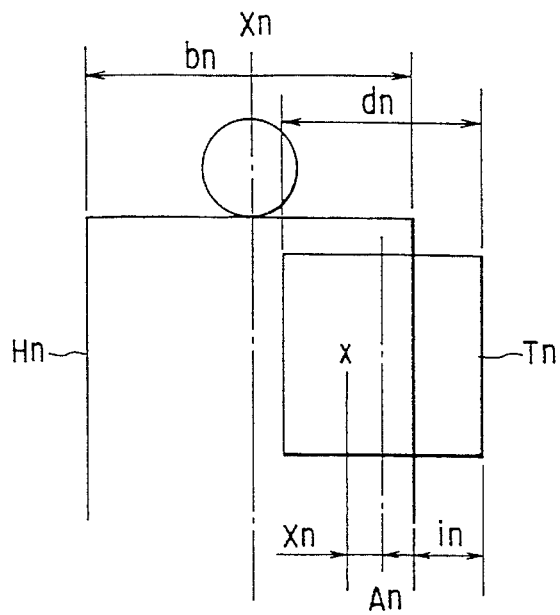
FIG. 3 is a view, showing a spot of light on an object.

FIG. 1 shows an active ranging device according to a first embodiment of the invention. In FIG. 1, a light-projecting section 21 has a light-emitting circuit 2 for controlling a xenon (Xe) tube 1 which emits ranging light. A mask 3 derives part of light from the Xe tube 1. The derived light is converged by a projecting lens 4 and then projected onto an object.

In light-receiving sections 22 and 23, light reflected from the object is converged on light-receiving elements 6a and 6b via light-receiving lenses 5a and 5b. The light-receiving elements 6a and 6b supply a distance calculating section 7 with photoelectric conversion signals indicative of a position in which the reflected light is converged. The distance calculating section 7 calculates a distance to the object on the basis of the photoelectric conversion signals. A data storage section 8 stores, in a time-series manner, one of the photoelectric conversion signals from the light-receiving elements 6a and 6b, and object distance data at each time point. These data stored in data storage section 8 are referred to herein as object distance data pieces. In the example shown in FIG. 1, the data storage section 8 stores the photoelectric signal output from the light-receiving element 6a.

A speed calculating section 9 calculates the movement speed of the object in the direction of the optical axis from an (n−1)th time point to an n-th time point, on the basis of object distance data pieces stored in the data storage section 8 at the (n−1)th time point and the n-th time point. Further, the speed calculating section 9 calculates the movement speed of the object in a direction perpendicular to the optical axis, based on object distance data pieces stored in the data storage section 8 at the (n−1)th time point and the n-th time point, and the photoelectric conversion signals.

Moreover, the speed calculating section 9 calculates the movement speed of the object in the direction of the optical axis on the basis of object distance data pieces at a plurality of time points. The speed calculating section 9 calculates the amount of spot eclipse of projected light on the basis of the data pieces obtained at a plurality of time points. In addition, the speed calculating section 9 calculates the movement speed of the object in a direction perpendicular to the optical axis, based on a change in the amount of spot eclipse.

Referring then to FIGS. 2 to 5, an explanation will be given of the principle of calculating the movement speed of the object in the direction of the optical axis and in a direction perpendicular to the optical axis.

In FIG. 2, reference symbol $l_n$ represents a distance to the object at the n-th time point, and reference symbol $l_{n-1}$ a distance to the object at the (n−1)th time point. Reference symbol $a_n$ represents a photoelectric signal value obtained from a distance to the object at the n-th time point, and reference symbol $a_{n-1}$ a photoelectric signal value obtained from object distance data at the (n−1)th time point. Reference symbol $e_n$ represents a photoelectric signal value of the light-receiving element 6a at the n-th time point, and reference symbol $a_{n-1}$ a photoelectric signal value of the same at the (n−1)th time point. Reference symbol $H_n$ represents the position of the object at the n-th time point, and reference symbol $H_{n-1}$ the position of the object at the (n−1)th time point. Reference symbol $T_n$ represents a light spot to the object at the n-th time point, and reference symbol $T_{n-1}$ a light spot to the object at the (n−1)th time point. That part of the light which is projected on the object is reflected therefrom. Although in the first embodiment, projected light has a square spot, it may have other shapes.

Supposing that the time period between the (n−1)th time point and the n-th time point is Δt, and the positions of the center of the object at the (n−1)th time point and the n-th time point are $X_n$ and $X_{n-1}$, respectively, the movement speed $v_{x,n}$ of the object in the direction of the X-axis in FIG. 3 (i.e. the horizontal direction) is expressed by $$v_{x,n}=(X_n-X_{n-1})/\Delta t \qquad (1)$$

The right edges (or characterizing points for estimating an outline of an image of the object) of the object are expressed by $$X_n+b_n/2=A_n+d_n/2-i_n \qquad (2)$$

$$X_{n-1}+b_{n-1}/2=A_{n-1}+d_{n-1}/2-i_{n-1} \qquad (3)$$

where $b_n$ represents the width of the object, $d_n$ the width of the spot of light, $i_n$ the amount of spot eclipse, and $A_n$ the centroid of the spot in the position of the object.

Further, supposing that the amount of displacement of the centroid $A_n$ of reflected light in the position of the object is $x_n$, $i_n$ is expressed as follows in consideration of the spot of the projected light is square:

$$i_n=2x_n \qquad (4)$$

$$i_{n-1}=2x_{n-1} \qquad (5)$$

From the equations (2) to (5), the following equation (6) is obtained:

$$X_n-X_{n-1}=A_n+D_n/2-2x_n-A_{n-1}-d_{n-1}/2+2\cdot x_{n-1} \qquad (6)$$

From the equations (1) and (6), the movement speed of the object can be obtained.

Figure 4:
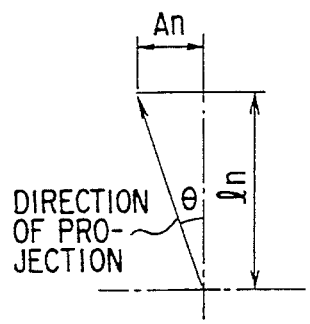
FIG. 4 is a view, showing an angle θ at which light is emitted from an Xe tube 1.

Moreover, if the direction of projection of light is θ as shown in FIG. 4, the center $A_n$ of gravity of the projected light is expressed by the following equation (7), and the size $d_n$ of the spot of the projected light is expressed by the following equation (8):

$$A_n = l_n \times \tan\theta \qquad (7)$$

$d_n$=(the size of the light-emitting section)×(a distance to the object)/(the focal distance of the light-projecting lens)+(the size of the light-projecting lens) (8)

Therefore, if the distance to the object and the direction of projection of light are constant, $A_n = A_{n-1}$ and $d_n = d_{n-1}$ and the equation (6) is expressed by $$X_n - X_{n-1} = -2x_n + 2x_{n-1} \qquad (9)$$

The manner of calculation for $x_n$ will now be explained.

Suppose that a photoelectric conversion signal value calculated backward from a distance to the object is a reference signal value a. The reference signal value a corresponds to a photoelectric conversion signal output from the light-receiving element when the entire ranging light is projected on the object with no eclipse. In other words, the reference signal value a is equal to a photoelectric conversion signal value when the centroid of the spot of the ranging light is superposed, in the position of the object, upon that of the spot of reflected light.

The light-receiving element actually outputs a photoelectric conversion signal value e in accordance with the centroid of the spot of light reflected from the object. Therefore, if only part of ranging light is radiated on the object as shown in FIG. 3, the photoelectric conversion signal value e is not equal to the reference signal value a because of a displacement of the centroid the spot of the ranging light from that of the reflected light in the position of the object.

From the difference between the photoelectric conversion signal value e actually output and the reference signal value a, $x_n$ can be calculated. From FIG. 2, $x_n$ is expressed by $$x_n = l_n(e_n - a_n)/fj \qquad (10)$$

$$x_{n-1} = l_{n-1}(e_{n-1} - a_{n-1})/fj \qquad (11)$$

where fj represents the focal distance of the light-receiving lens.

The manner of calculation of the movement speed $v_{z \cdot n}$ of the object in the direction of the optical axis will be explained.

Since the movement amount $z_n$ in the direction of the optical axis means a change in a distance to the object, it is expressed by $$z_n = l_n - l_{n-1} \qquad (12)$$

The movement speed $v_{z \cdot n}$ is expressed by $$v_{z \cdot n} = z_n / \Delta t \qquad (13)$$

Figure 5:
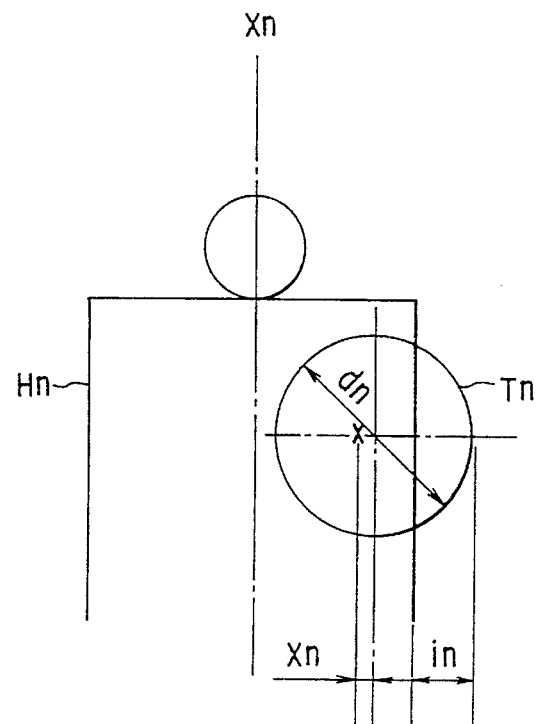
FIG. 5 is a view, showing a spot of light on another object.

Although FIG. 3 shows the case where the spot of the projected light is square in shape, an explanation will now be given of a case where the spot is circular in shape, with reference to FIG. 5. FIG. 5 shows the relationship between an object and the spot of projected light. The basic idea of this case is similar to that of the case where the spot is square, and the movement speed $v_{z \cdot n}$ of the object in the direction of the optical axis can be obtained from the equations (12) and (13). Although the movement speed of the object in a direction perpendicular to the optical axis, too, can be obtained in a manner similar to the square-spot case, $i_n$ and $x_n$ in the equations (4) and (5) have the following relationship, which significantly differs from that in the square-spot case:

$$x_n = \frac{2 \cdot \left\{ \sqrt{\frac{d_n^2}{4} - \left(\frac{d_n}{2} - i_n\right)^2} \right\}^3}{3 \left\{ \left(\frac{d_n}{2} - i_n\right) \cdot \sqrt{\frac{d_n^2}{4} - \left(\frac{d_n}{2} - i_n\right)^2} + \frac{d_n^2}{4}\left(\sin^{-1}\frac{d_n - 2i_n}{d_n} + \frac{\pi}{2}\right) \right\}} \qquad (14)$$

(the range of the solution of $i_n$ is $-d_n/2 \leq i_n \leq d_n/2$)

$$x_{n-1} = 2 \cdot \left\{ \sqrt{\frac{d_{n-1}^2}{4} - \left(\frac{d_{n-1}}{2} - i_{n-1}\right)^2} \right\}^3 /$$
$$3\left\{ \left(\frac{d_{n-1}}{2} - i_{n-1}\right) \cdot \sqrt{\frac{d_{n-1}^2}{4} - \left(\frac{d_{n-1}}{2} - i_{n-1}\right)^2} + \frac{d_{n-1}^2}{4}\left(\sin^{-1}\frac{d_{n-1} - 2i_{n-1}}{d_{n-1}} + \frac{\pi}{2}\right) \right\} \qquad (15)$$

(the range of the solution of $i_{n-1}$ is $-d_{n-1}/2 \leq i_{n-1} \leq d_{n-1}/2$)

In the circular-spot case, the movement speed of the object in the direction perpendicular to the optical axis can be obtained by calculating $i_n$ and $i_{n-1}$ from the equations (14) and (15) instead of the equations (4) and (5). Furthermore, the movement of the object in two directions perpendicular to the optical axis can also be detected by using a light-receiving element (e.g. two-dimensional PSD: Position Sensitive Diode) capable of detecting the receiving position of ranging light in a two-dimensional manner. Thus, three-dimensional movement of the object (i.e. movement in the direction of the optical axis and in the two directions perpendicular thereto) can be detected.

As explained above, since in the first embodiment, the movement speed of an object in the direction of the optical axis and in a direction perpendicular thereto can be calculated without repeating ranging at a plurality of points, ranging can be performed at high speed without consuming a great amount of energy.

Further, since the Xe tube which can emit light of much higher intensity than an infrared-emission diode used as a conventional light source is used, accurate ranging can be performed without repeating ranging, thereby increasing the speed of ranging. In addition, since two light-receiving sections are employed, accurate distance data can be obtained even when spot eclipse has occurred during movement of an object.

The reason why the first embodiment employs square spot light is that the amount of displacement of the centroid of the spot of ranging light from that of the spot of reflected light can be calculated in a simple manner on the basis of the difference between a photoelectric conversion signal and a reference signal. Further, although in the first embodiment, the light-projecting section 21 is interposed between the two light-receiving sections 22 and 23, the invention is not limited to this.

Referring then to FIG. 6, a ranging device for cameras according to a second embodiment of the invention will be explained.

As is shown in FIG. 6, in the light-projecting section 21, the Xe tube 1 is driven by the light emission circuit 2 for emitting ranging light onto an object, and the mask 3 derives part of the light from the Xe tube 1. The derived light is converged by a projecting lens 4 and then projected onto an object. A projection-direction switching section 10 switches the direction of projected light with the use of the mask 3, thereby enabling ranging at a plurality of points.

In the light-receiving sections 22 and 23, light reflected from the object is converged on light-receiving elements 6a and 6b via light-receiving lenses 5a and 5b. The light-receiving elements 6a and 6b supply a distance calculating section 7 with photoelectric conversion signals indicative of a position in which the reflected light is converged. The distance calculating section 7 calculates a distance to the object on the basis of the photoelectric conversion signals. An object-width calculating section 11 calculates the width of the object on the basis of a plurality of object distance data pieces and the direction of projected light. A data storage section 8 stores object distance data calculated by the distance calculating section 7, one of the photoelectric conversion signals from the light-receiving elements 6a and 6b (in this case, the photoelectric signal output from the light-receiving element 6a), and object-width data calculated by the object-width calculating section 11.

The speed calculating section 9 calculates the movement speed of the object in the direction of the optical axis on the basis of a plurality of object distance data pieces stored in the data storage section 8. Moreover, the section 9 calculates the movement speed of the object in a direction perpendicular to the optical axis on the basis of changes in object distance data at a plurality of time points and changes in photoelectric conversion signal at a plurality of time points.

An exposure control section 16 controls the shutter opening time period of a photographing lens and the shutter aperture of the same in consideration of the movement speed of the object calculated by the speed calculating section 9. An estimating section 12 estimates the position of the object and a distance thereto at the time of photographing, on the basis of the output of the speed calculating section 9 in consideration of a period of time from the termination of ranging to the start of photographing.

A spot-eclipse judging section 13 judges whether or not the object falls within a photographing range, based on the estimated position of the object and the estimated distance thereto at the time of photographing, and also on object-width data stored in the data storage section 8. A photographing-range altering section 14 alters the photographing range in accordance with an output from the spot-eclipse judging section 13. The section 14 also functions as a zoom mechanism for a photographing lens (not shown). A focal-point adjusting section 15 adjusts the focal point of the photographing lens on the basis of the position of the object estimated by the estimating section 12.

Figure 7A:
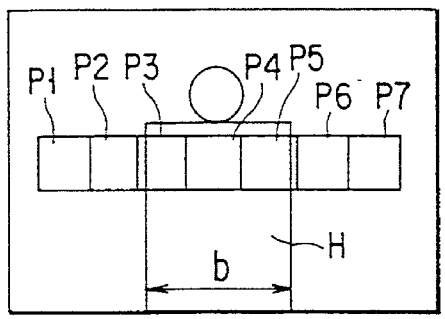
FIG. 7A is a view, showing the relationship, at a first time point, between an object and ranging light beams in the position of the object.
Figure 7C:
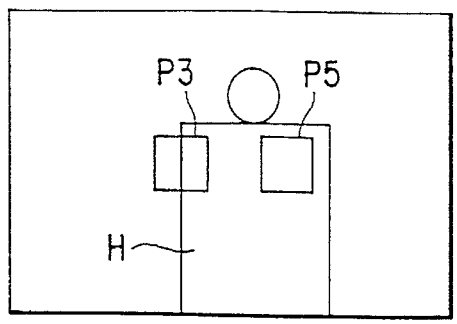
FIG. 7C is a view, showing the relationship, at a second time point, between the object and ranging light beams in the position of the object.
Figure 7B:
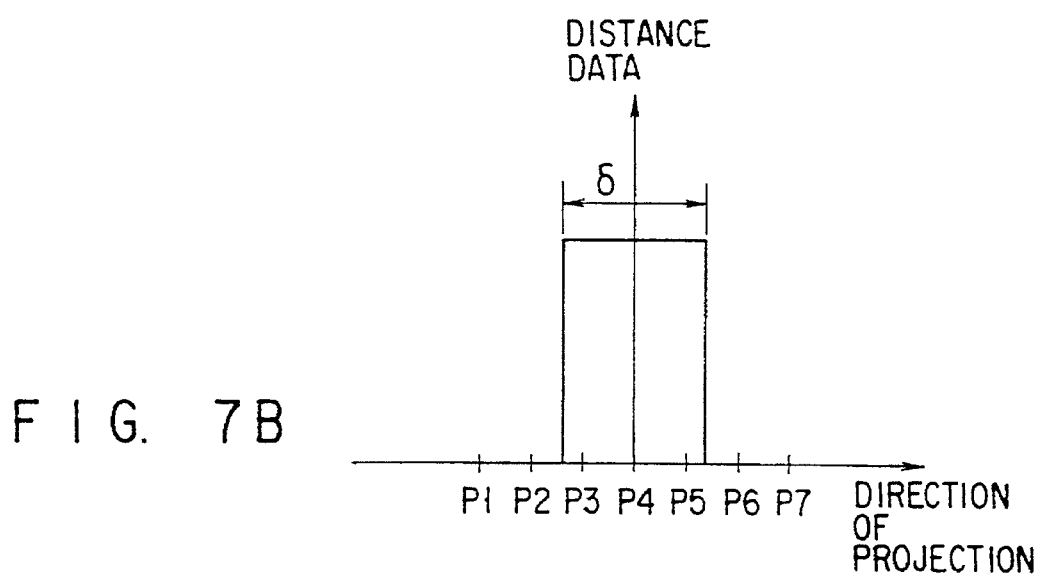
FIG. 7B is a view, showing the relationship, at the first time point, between the direction of projection of the ranging light and object distance data.

Referring then to FIGS. 7A to 7C and FIG. 8, the operation of the second embodiment will be explained. FIG. 7A shows the relationship at a first time point between the object and the spots of ranging light beams in the position of the object. Reference signs P1 to P7 designate the spots of ranging light beams in various projection directions, and reference sign H the object. FIG. 7B shows relationship between the projection directions and object distance data at the first time point. FIG. 7C shows the relationship at a second time point between the object and the spots of ranging light beams in the position of the object.

When a power switch (not shown) has been turned on to supply power to the active ranging device, the device starts to operate. If push of the release button of a camera (not shown) is detected in a step S1, the active ranging device resets a variable n (which indicates the number of occasions of ranging) to 0 in a step S2, thereby incrementing the variable in a step S3, and starting the operation of the projection-direction switching section 10 in a step S4.

Subsequently, the active ranging device measures distances to a plurality of points (7 points indicated by P1 to P7 in this embodiment) at the first time point. Although it is desirable to simultaneously measure distances to the 7 positions, distances to the 7 positions may be successively measured during a sufficiently short period of time as compared with the movement speed of the object. In other words, the first time point may have a short time period. The distribution of object distance data with respect to the projection directions can be grasped from the ranging at the first time point. In the case, for example, of FIG. 7A, object distance data as shown in FIG. 7B can be obtained (step S5).

Thereafter, the object-width calculating section 11 calculates the width b of the object, and the data storage section 8 stores the width b as the object width data. When, for example, object distance data shown in FIG. 7B has been obtained, i.e. when constant distance data pieces exist in a projection-direction range δ, it is determined that the same object exists in the range δ, thereby calculating the object width b on the basis of the range δ and the object distance data pieces therein (step S6).

Then, the active ranging device uses object distance data corresponding to the middle point indicated by P4 in FIG. 7A, as object distance data at the first time point, and stores the data in the data storage section 8 (step S7). The active ranging device then selects those opposite edge portions of the object which correspond to P3 and P5 of FIG. 7A, as portions to be ranged at the second time point et seq. Determination as to which points correspond to the opposite edge portions of the object is performed by comparing a photoelectric conversion signal value based on object distance data corresponding to each point, with a photoelectric conversion signal value actually output. If the former value differs from the latter value, it is determined that the point, a distance to which has been measured, corresponds to one of the edge portions of the object (step S8). Further, the determination can be performed also by comparing photoelectric conversion signal values output from the light-receiving sections 22 and 23. In this case, if the signal values differ from each other, the object-width calculating section 11 determines that a corresponding portion is one of the edge portions of the object.

In a step S9, the data storage section 8 stores a photoelectric conversion signal output from the light-receiving element 6a, after the distance to the point selected in the step S8 is measured at the first time point. It is determined in a step S10 whether or not n=2. If n is not 2, the program proceeds to a step S11, where n is incremented. In a step S12, ranging is performed in directions corresponding to the points P3 and P5 selected in the step S8, thereby calculating a distance to the object with the use of the distance calculating section 7. FIG. 7C shows the relationship at the second time point between the object and the spots of ranging light beams in the position of the object.

The data storage section 8 stores, in a step S13, the distance data calculated in the step S12, and stores, in a step S14, a photoelectric conversion signal output from the light-receiving element 6a at the time of ranging in the step S12. The speed calculating section 9 calculates the difference between the actual photoelectric conversion signal value and a photoelectric conversion signal value calculated from distance data pieces stored in the data storage section 8 at the (n–1)th time point and the n-th time point, thereby calculating a change in object distance data between the (n–1)th time point and the n-th time point. As in the first embodiment, the movement speed of the object in a direction perpendicular to the optical axis is calculated on the basis of a change in object distance data between the (n–1)th time point and the n-th time point. Further, the movement speed in the direction of the optical axis is calculated in the same manner as employed in the first embodiment, followed by returning to the step S10 (step S15).

On the other hand, if it is determined in the step S10 that n=2, the program proceeds to a step S16, where the operation of the projection-direction switching section 10 is stopped. In a step S17, the estimating section 12 calculates the position of the object and a distance thereto assumed at the time of photographing, after calculating the time required from the termination of ranging to the start of photographing on the basis of the movement speed of the object determined by the speed calculating section 9 in the step S15.

In a step S18, the spot-eclipse judging section 13 judges whether or not the object falls in a photographing range, based on the position of the object and the distance thereto at the time of photographing, calculated by the estimating section 12 in the step S17, and also on object-width data stored in the data storage section 8 in the step S6. If it is judged that the object does not fall within the photographing range partially or entirely, the program proceeds to a step S19, where the photographing-range altering section 14 alters the photographing range so that the object falls within the photographing range. If, on the other hand, it is judged in the step S18 that the object falls within the photographing range, the range is not altered and the program proceeds to a step S20.

In the step S20, the focal-point adjusting section 15 adjusts the focal point of the photographing lens on the basis of the distance to the object estimated by the estimating section 12 in the step S17. In a step S21, such a combination of a shutter-opening time period and an aperture degree as can prevent blurring is selected from a plurality of combinations of them resulting from automatic exposure control, in consideration of the movement speed of the object output from the speed calculating section 9 in the step S15. In a step S22, the projection-direction switching section 10 is initialized, followed by the termination of a series of control.

As explained above, in the second embodiment, high-speed ranging is aimed at the second time point, and distances to opposite edge portions of the object are measured at the first time point so that the movement speed of the object can be calculated even when the object has moved left or right in FIG. 7A. However, this may be modified such that a distance to only one portion of the object is measured at the second time point, in order to perform higher-speed ranging.

Figure 7D:
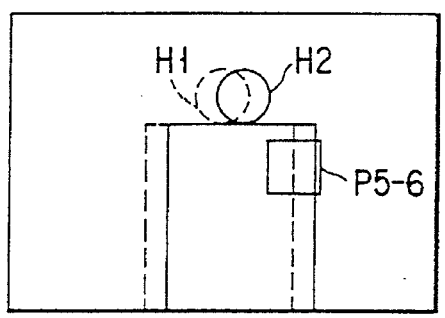
FIG. 7D is a view, showing the relationship between the object and ranging light assumed in a case where one edge portion of the object which is superposed upon the center of the spot of ranging light is selected at the first time point; the direction of projection of the ranging light is altered; and the movement speed of the object is calculated by measuring only a distance to the one of edge portions of the object.

Moreover, the second embodiment can be modified as follows: One edge portion of the object which is superposed upon the center of the spot of ranging light (e.g. an intermediate portion between P5 and P6 in FIG. 7A) is selected at the first time point, and the direction of projection of the ranging light is altered so as to measure only a distance to the one of edge portions of the object. As a result, the distance to the one edge portion of the object, i.e. the distance to the object, can be reliably measured at the second time point, even when the object has moved left or right in FIG. 7A. FIG. 7D shows the relationship between the spot of the ranging light and the object in this case. In FIG. 7D, reference sign H1 represents the position of the object at the first time point, reference sign H2 the position of the object at the second time point, and reference sign P5-6 the spot of the ranging light at the second time point. In the FIG. 7D case, the center of the spot of the ranging light at the second time point corresponds to a right-side edge portion of the object at the first time point.

Figure 7E:
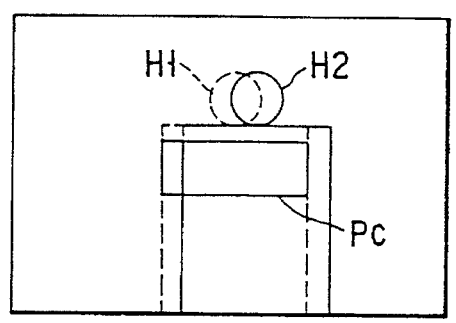
FIG. 7E is a view, showing the relationship between the object and the ranging light assumed when the width of the spot of the ranging light, based on object width data obtained by ranging at the first time point, is made equal to the width of the object.

In addition, if the width of the spot of the ranging light is altered to a value equal to the width of the object on the basis of object-width data obtained by the ranging at the first time point, a distance to an edge portion of the object can be obtained and accordingly the movement speed of the object can be calculated, by measuring only a distance to a center portion of the object at the first time point, even when the object has moved left or right in FIG. 7A. FIG. 7E shows the relationship between the spot of the projected light and the object in this case. In FIG. 7E, reference sign H1 represents the position of the object at the first time point, reference sign H2 the position of the object at the second time point, and reference sign Pc the spot of projected light at the second time point. The width of the spot of the projected light is made equal to the width of the object. Furthermore, if it is not necessary to perform ranging at high speed, ranging may be modified such that distances to a plurality of portions of the object are measured at the second time point, too, in order to enable more accurate detection of the movement of the object.

Figure 8:
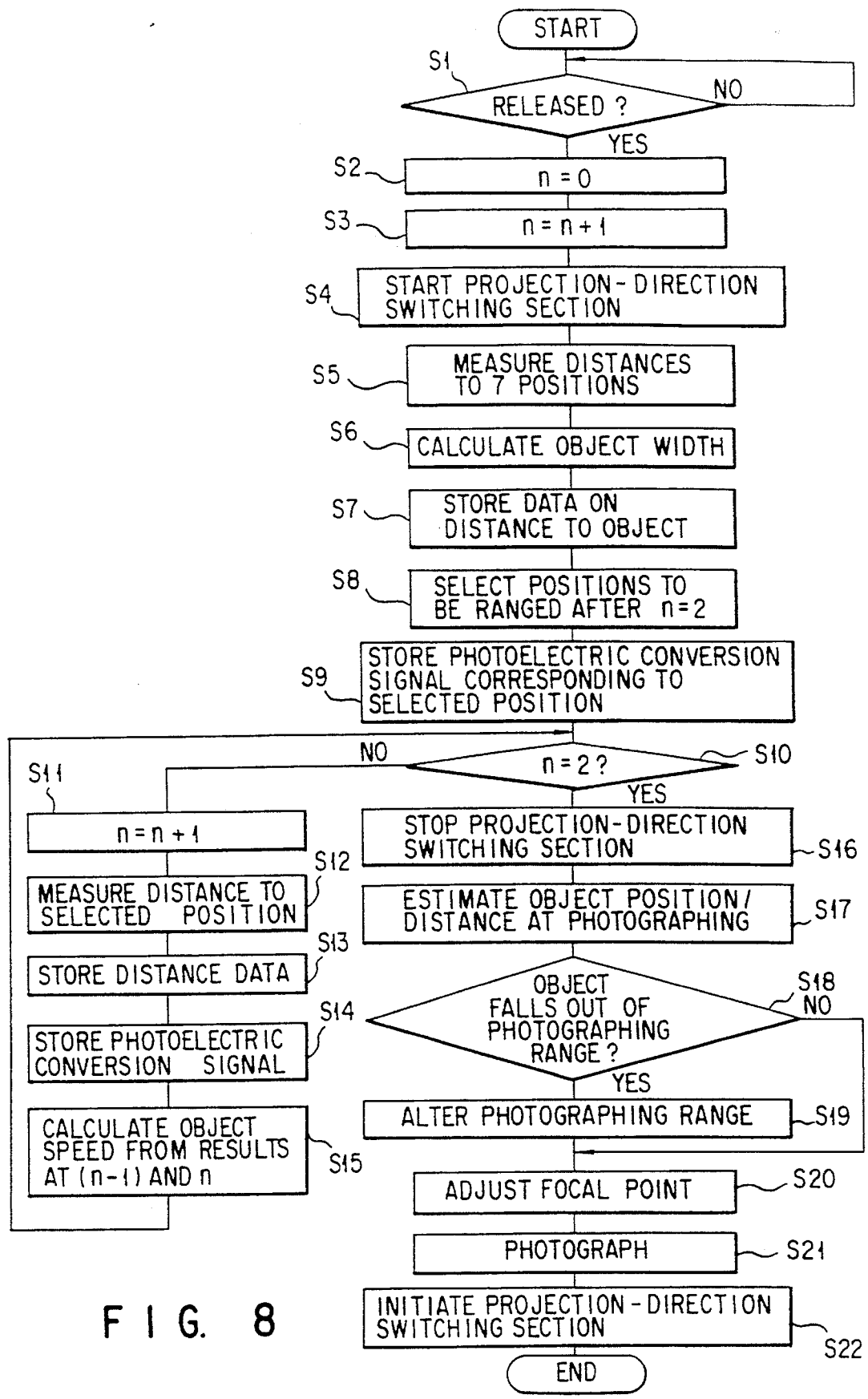
FIG. 8 is a flowchart for illustrating the operation of an active ranging device according to a second embodiment.

Although in the second embodiment, ranging is performed at two time points, it may be performed at more time points. In this case, it suffices if n in the step S10 in FIG. 8 is set to any desired value more than 2. Further, at the time of performing ranging at a third time point et seq., if the movement speed of the object is calculated at the first and second time points by observing the movement of its edge portions, ranging at the third time point et seq. can be performed while tracing each edge portion of the object, by controlling the estimating section 12 to estimate the position of the object at the next time point on the basis of the calculated movement speed thereof, and controlling the projection-direction switching section 10 to switch the direction of light projection. In this case, it suffices if the movement speed of the object is calculated as a result of ranging at the first and second time points. Therefore, the movement speed of the object may be calculated from the movement of the edges of the object determined by measuring distances to a plurality of points (which include the position of the object) at both the first and second time points, and detecting the positions of the edges. Alternatively, to enhance the speed of ranging, distances to 7 points may be measured at the first time point as in the second embodiment, and distances to both opposite edge portions of the object may be measured at the second time point. In other words, the number of points, distances to which are measured, may be set less at the second time point than at the first time point.

Further, to enhance the speed of ranging at the third time point et seq., only a distance to one portion of the object may be measured, or edge portions of the object, distances to which are measured, may be selected so as to facilitate the projection of light onto the object. In this case, if the light fails to be projected on the object at the second time point et seq., distances to a plurality of points may be again measured such that the light can be securely projected onto the object.

Although in the second embodiment, only object distance data corresponding to a center portion of the object is used at the first time point, average distance data on a plurality of portions (indicated by P3, P4, P5 in FIG. 7A) judged to be incorporated in the same object may be used as object distance data at the first time point in order to enhance the accuracy of the object distance data.

As explained above, since in the second embodiment, measurement of distances to a plurality of points is not repeated, the movement speed of an object and the distance thereto can be calculated at high speed, and the focal point of a photographing lens can be adjusted appropriately and the opening time period of the shutter of a camera can be set to an appropriate value. As a result, a well-focused photograph free from blur can be obtained. Moreover, in the case where the object moves out of the photographing screen of the camera, the photographing range can be altered to prevent the object from falling out of the range.

Figure 9A:
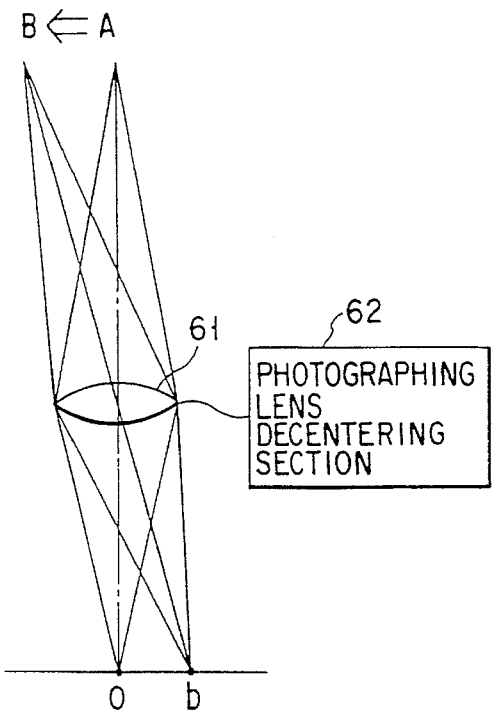
FIGS. 9A and 9B are views, useful in explaining an active ranging device according to a third embodiment.
Figure 9B:
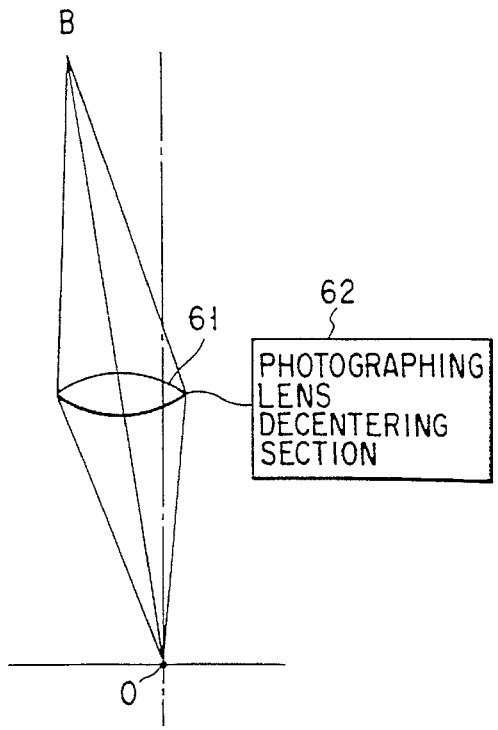

Referring to FIGS. 9A and 9B, a third embodiment of the invention will be explained.

The third embodiment is basically similar to the second embodiment, except that the photographing-range altering section 14 is replaced with a photographing-lens decentering section 62 for decentering a photographing lens 61 to alter the photographing range. If in the third embodiment, the exposure control section 16 cannot set a shutter speed value which enables an object to be photographed without blur, e.g., if the object blurs even at a shutter speed obtained by automatic exposure control, the photographing screen is altered by the photographing-range altering section 14 on the basis of the output of the estimating section 12 such that the object is situated at the center of the screen, thereby starting photographing. Further, the estimating section 12 is driven to estimate the movement of the object until the termination of photographing, and the photographing-range is continuously altered by the section 14 during photographing on the basis of the output of the estimating section 12 such that the object is photographed at the center of the screen.

If the photographing-range is not altered when the object has been moved during photographing from a point A to a point B in FIG. 9A, a photograph is obtained at the termination of photographing, in which an image of the object is formed at a point b. In other words, the image blurs by the distance 0–b. If, however, the photographing-range is altered as described above, the image is formed, as shown in FIG. 9B, at the same point 0 at the termination of photographing, as at the start of photographing. Thus, a photograph without blur can be obtained.

In a case where the exposure control section 11 can set such a shutter speed value as enables the object to be photographed without blur, photographing is started after the photographing range is altered such that the object is situated at the center of the photographing screen, and the photographing range is not altered during photographing. In this case, the object is kept at the center of the screen, and a photograph in which the object and the background are free from blur can be obtained.

Moreover, in order to obtain a photograph in which only the background is blurred, the shutter speed is intentionally set to a low value with the use of a separate external input unit even when an appropriate shutter speed which enables the object to be photographed without blur can be set, and the photographing range is altered during photographing, too. As a result, the object can be prevented from blur and the background can be intentionally blurred. Thus, photographing can be performed so as to meet the photographer's intention.

Furthermore, the photographing-lens decentering section 62 may have another function as well as the above-described one. For example, the section 62 may function as parallax correction means for correcting parallax between the photographing lens and the finder optical system, or as blur correction means for preventing blur due to a manual operation.

As explained above, in the third embodiment, a moving object can be always photographed at the center of the photographing screen. Further, so-called, in which the object is free of blur and the background is blurred, can be performed by no complicated operation.

In addition, the active ranging device according to the third embodiment can detect the movement of an object in the direction of the optical axis and in a direction perpendicular thereto. Also, since measurement of distances to a plurality of points is not repeated, the ranging can be performed at high speed and the consumed energy can be saved. Therefore, this active ranging device according to the third embodiment is suitable for a camera for photographing a moving object.

Figure 10:
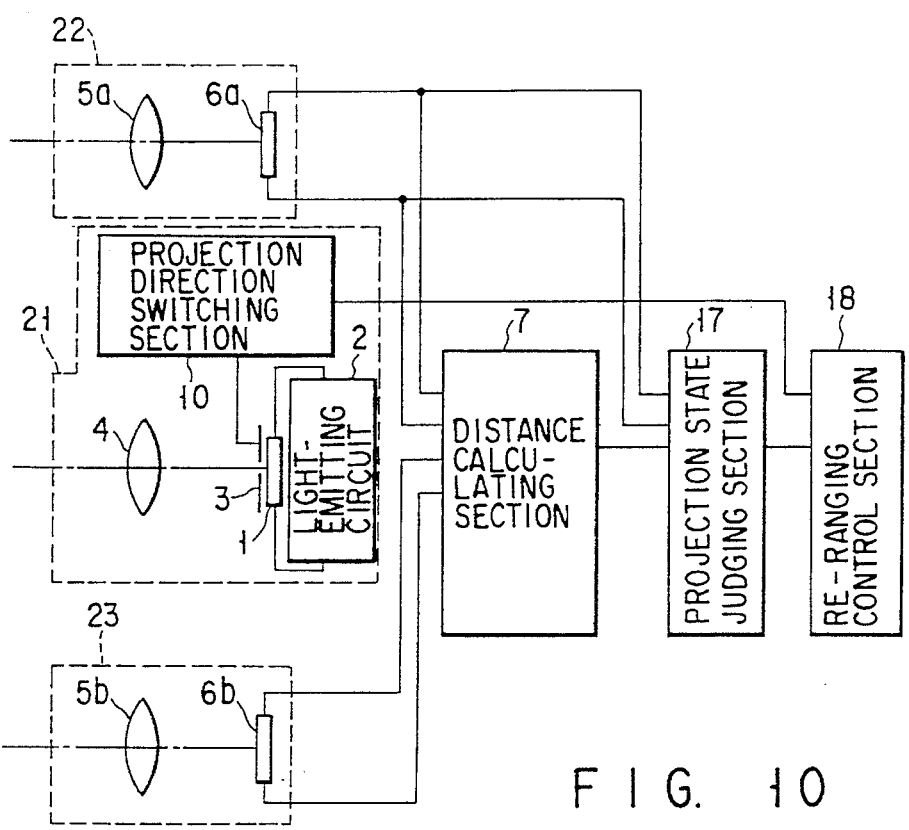
FIG. 10 is a view, showing an active ranging device according to a fourth embodiment.

Referring to FIG. 10, a fourth embodiment of the invention will be explained.

In the light-projecting section 21, the light-emitting circuit 2 causes the Xe tube 1, as a light source for projecting ranging light onto an object, to emit light, and also causes the mask 3 to derive part of light from the Xe tube 1. The light derived by the mask 3 is converged by the light-projecting lens 4 and projected onto an object. The projection-direction switching section 10 switches the direction of projection of light by moving the mask 3, thereby enabling measurement of distances to a plurality of points and measurement in a desired direction. In the light-receiving sections 22 and 23, light beams reflected from the object are converged onto the light-receiving elements 6a and 6b through the light-receiving lenses 5a and 5b, respectively. The light-receiving elements 6a and 6b output photoelectric conversion signals corresponding to the points at which the reflected light beams have entered. The distance calculating section 7 calculates a distance to the object on the basis of the photoelectric conversion signals from the light-receiving elements 6a and 6b. A projection-state judging section 17 judges the condition of range-finding light reflected by the object on the basis of object distance data output from the distance calculating section 7 and the photoelectric conversion signal output from one (element 6a in the case of FIG. 10) of the light-receiving elements 6a and 6b. If spot eclipse is detected, the amount of eclipse is calculated. If the projection-state judging section 17 judges that there is spot eclipse, a re-ranging control section 18 calculates a direction of projection, in which occurrence of spot eclipse is prevented, on the basis of the amount of eclipse calculated by the section 17, and drives the projection-direction switching section 10 to switch the direction of projection of light to the calculated one.

Figure 11:
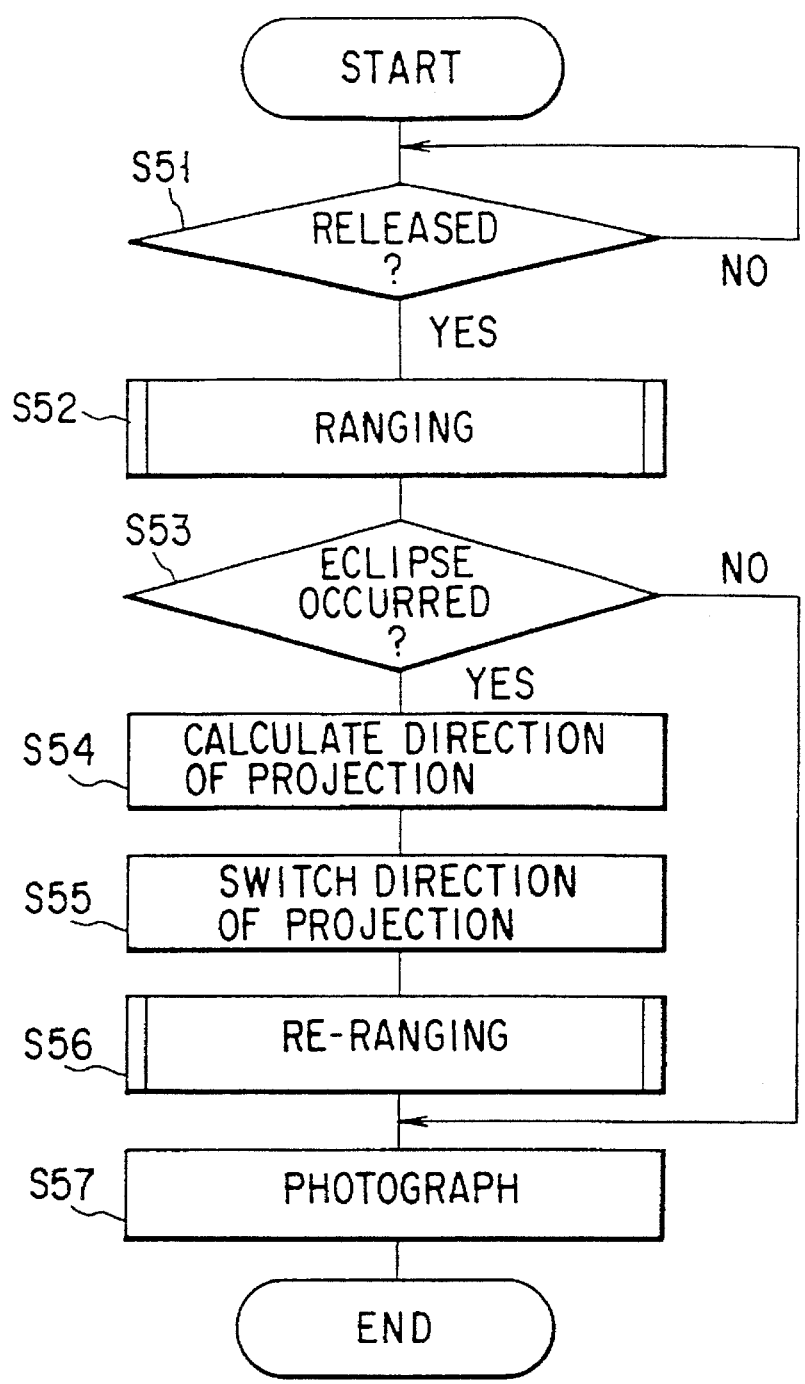
FIG. 11 is a flowchart for illustrating the operation of an active ranging device according to the fourth embodiment.

The operation of the fourth embodiment will be explained with reference to FIG. 11.

In a step S51, it is detected whether the release button of a camera (not shown) has been pushed. If it is detected that the release button has been pushed, a program proceeds to a step S52, where ranging is performed. In a step S53, the projection-state judging section 17 detects the condition of range-finding light beams reflected by the object, thereby judging whether or not spot eclipse has occurred and calculating the amount of eclipse.

In the case where it is judged that spot eclipse has occurred, the program proceeds to a step S54, where the re-ranging control section 18 calculates a direction of projection, in which occurrence of spot eclipse is prevented, on the basis of the amount of eclipse calculated by the section 17.

If, on the other hand, it is judged that spot eclipse has not occurred, the program proceeds to a step S57.

The determination as to whether or not spot eclipse has occurred is performed by comparing a photoelectric conversion signal value calculated on the basis of object distance data, with the actually output photoelectric conversion signal value. If there is a difference therebetween, it is judged that spot eclipse has occurred. The amount of eclipse depends upon the configuration of the spot of projected light. If the spot of projected light is square, the amount of eclipse is calculated using the equation (4). On the other hand, if the spot of projected light is circle, the amount of eclipse is calculated using the equation (14). In a step S55, the projection-direction switching section 10 switches the ranging light to that direction calculated by the re-ranging control section 18 in the step S54, in which re-ranging is to be performed. Re-ranging is performed in a step S56, and photographing is performed in a step S57, followed by the termination of the program.

As explained above, when in the fourth embodiment, spot eclipse has occurred, its amount is calculated, and the direction of projection of light is altered so as to avoid spot eclipse at the time of re-ranging. Therefore, degradation of ranging accuracy due to spot eclipse can be prevented, and highly accurate ranging data can be obtained at all times.

In summary, since the present invention can detect the condition of range-finding light beams reflected by the object can be detected, it can provide a ranging device capable of accurately and promptly detecting the movement of the object in at least two directions, and also a ranging device capable of detecting spot eclipse.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A range-finding device comprising:

light-projecting means for projecting range-finding light beams toward an object;

a plurality of light-receiving means for receiving light beams reflected from the object; and calculating means for calculating a distance to the object and a condition of range-finding light beams reflected by the object on the basis of a plurality of outputs from the light-receiving means.

2. The range-finding device according to claim 1, wherein the calculating means includes:

means for calculating the distance to the object and the condition of range-finding light beams reflected by the object on the basis of a plurality of outputs from the light-receiving means; and means for calculating a movement speed of the object in two directions perpendicular to each other including at least a direction of an optical axis of a photographing lens on the basis of changes in the calculated distance and condition of range-finding light beams reflected by the object with the passing of time.

3. The range-finding device according to claim 2, further comprising correction means for correcting a position of the photographing lens at a time of film exposure on the basis of the calculated movement speed of the object.

4. A range-finding device for performing a plurality of range-finding operations, comprising:

light-projecting means for projecting range-finding light onto an object;

projection-direction switching means for successively switching a direction in which the range-finding light is projected;

at least two light-receiving means for receiving light reflected from the object; and calculating means for extracting, at a first time of range-finding, a characterizing point of the object on the basis of outputs from the light-receiving means which indicate a distance to the object and a condition of range-finding light reflected by the object, for measuring again, at a second time of range-finding, a distance to the characterizing point or to a region in the vicinity of the object including the characterizing point, and for calculating a movement speed of the object in a direction of an optical axis of a photographing lens and in at least two directions perpendicular to the direction of the optical axis on the basis of a plurality of object distance data pieces and changes in the condition of range-finding light reflected by the object with the passing of time.

5. A range-finding device for performing a plurality of range-finding operations, comprising:

light-projecting means for projecting range-finding light onto an object;

projection-direction switching means for switching a direction in which the range-finding light is projected;

at least two light-receiving means for receiving light reflected from the object;

calculating means for calculating a plurality of object distance data pieces on the basis of outputs from the light-receiving means, and for also calculating a movement speed of the object in a direction of an optical axis of a photographing lens and in at least two directions perpendicular to the direction of the optical axis on the basis of changes in a condition of range-finding light beams reflected by the object with the passing of time; and photographing-lens correcting means for correcting the state of the photographing lens on the basis of an output from the calculating means which indicates a position of the object at the time of film exposure.

6. The range-finding device according to claim 5, wherein the photographing-lens correcting means includes at least one of zoom means for zooming the photographing lens, parallax correcting means for correcting parallax between the photographing lens and a view-finder optical system, and blur correcting means for correcting blurring of an image of the object.

7. A range-finding device for performing a plurality of range-finding operations, comprising:

light-projecting means for projecting range-finding light onto an object;

projection-direction switching means for sequentially switching a direction in which the range-finding light is projected;

at least two light-receiving means for receiving light reflected from the object; and calculating means for calculating a plurality of object distance data pieces on the basis of outputs from the light-receiving means, for calculating a centroid of a spot of the reflected light with the use of one of the outputs from the light receiving means, and for calculating a movement speed of the object in a direction of an optical axis of a photographing lens and in at least two directions perpendicular to the direction of the optical axis on the basis of the object distance data pieces and changes in a condition of range-finding light beams reflected by the object with the passing of time.

8. A range-finding device for performing a plurality of range-finding operations, comprising:

light-projecting means for projecting range-finding light onto an object;

projection-direction switching means for sequentially switching a direction in which the range-finding light is projected;

at least two light-receiving means for receiving light reflected from the object;

calculating means for extracting a characterizing point of the object on the basis of outputs from the light-receiving means which indicate a distance to the object and a condition of range-finding light beams projected on the object, and for calculating a movement speed of the object in a direction of an optical axis of a photographing lens and in at least two directions perpendicular to the direction of the optical axis on the basis of a plurality of object distance data pieces and changes in the condition of range-finding light beams reflected by the object with the passing of time; and control means for controlling the projection-direction switching means in accordance with the movement speed of the object calculated by the calculating means.

9. A range-finding device for performing a plurality of range-finding operations, comprising:

light-projecting means for projecting range-finding light onto an object;

projection-direction switching means for sequentially switching a direction in which the range-finding light is projected;

at least two light-receiving means for receiving light reflected from the object; and calculating means for causing the light-projecting means to project the range-finding light at a first time of range-finding to calculate a first distance to the object and a width of the object on the basis of outputs from the light-receiving means, and for causing the light-projecting means to project the range-finding light at subsequent times of range-finding on the basis of the calculated width of the object and the calculated first distance thereto to calculate a second distance to the object.

10. A range-finding device, comprising:

light-projecting means for projecting range-finding light onto an object;

projection-direction switching means for sequentially switching a direction in which the range-finding light is projected;

at least two light-receiving means for receiving light reflected from the object; and control means for calculating a distance to the object and a condition of range-finding light projected on the object on the basis of outputs from the light-receiving means, and for controlling the projection-direction switching means to switch the direction of projection of the range-finding light in accordance with the condition of range-finding light projected on the object to perform re-rangefinding.

11. A multipoint active type range-finding device for performing a plurality of range-finding operations, said multipoint active type range-finding device having a binocular light-receiving section, and said multipoint active type range-finding device comprising:

light-projecting means for successively projecting range-finding light beams onto a plurality of points of an object in a photographing screen;

light-receiving means for receiving light beams reflected from two points of the object which are apart from each other by a predetermined distance; and calculating means for determining an estimated outline of an image of the object on the basis of signals output from the light-receiving means, and for estimating a position of the object assumed at a time of film exposure on the basis of positions of the object detected by performing range-finding a plurality of times, thereby calculating an appropriate position of a photographing lens.

12. The range-finding device according to claim 11, comprising means for performing range-finding with respect to an object which moves in directions perpendicular to an optical axis of the photographing lens.

13. A multipoint active type range-finding device for performing a plurality of range-finding operations, said multipoint active type range-finding device having a binocular light-receiving section, and said multipoint active type range-finding device comprising:

light-projecting means for successively projecting range-finding light beams onto a plurality of points of an object in a photographing screen;

light-receiving means for receiving light beams reflected from two points of the object which are apart from each other by a predetermined distance; and control means for detecting a condition of range-finding light projected on the object on the basis of signals output from the light-receiving means, and for controlling the light-projecting means to shift the projection of range-finding light beams such that the condition of range-finding light projected on the object is shifted to a predetermined state, and for performing re-ranging to determine an appropriate position of a photographing lens.

\* \* \* \* \*

UNITED STATES PATENT AND TRADEMARK OFFICE
CERTIFICATE OF CORRECTION

PATENT NO. : 5,617,174
DATED : April 1, 1997
INVENTOR(S) : MIKAMI, Kazuo

It is certified that error appears in the above-identified patent and that said Letters Patent is hereby corrected as shown below:

```
Title page, Item [57] ABSTRACT, line 10, after "other" insert --,--
```

Signed and Sealed this

Seventh Day of July, 1998

Attest:

BRUCE LEHMAN

*Attesting Officer*      *Commissioner of Patents and Trademarks*